United States Patent [19]

Killer

[11] 4,297,186
[45] Oct. 27, 1981

[54] METHOD AND APPARATUS FOR REDUCING THE ACTIVATION ENERGY OF CHEMICAL REACTIONS

[76] Inventor: Walter HP Killer, Burghalde 10, Lenzburg, Switzerland

[21] Appl. No.: 29,100

[22] Filed: Apr. 11, 1979

Related U.S. Application Data

[63] Continuation of Ser. No. 775,229, Mar. 7, 1977, abandoned.

[30] Foreign Application Priority Data

Mar. 16, 1976 [CH] Switzerland ................. 3292/76

[51] Int. Cl.³ ................................. C08F 2/52
[52] U.S. Cl. ........................... 204/165; 204/168
[58] Field of Search ............ 204/165, 168, 169, 176

[56] References Cited

U.S. PATENT DOCUMENTS

| | | | |
|---|---|---|---|
| 942,046 | 12/1909 | Ashley | 204/176 |
| 1,498,393 | 6/1924 | McEachron | 204/176 |
| 2,864,756 | 12/1958 | Rothacker | 204/168 |
| 3,196,270 | 7/1965 | Rosenthal | 204/165 X |
| 3,280,018 | 10/1966 | Denis | 204/164 |
| 3,321,391 | 5/1967 | Warfield et al. | 204/165 |
| 3,391,314 | 7/1968 | Carter | 317/262 |
| 3,475,307 | 10/1969 | Knox et al. | 204/168 |
| 3,514,393 | 5/1970 | Eisby | 250/531 |
| 3,585,122 | 6/1971 | King | 204/302 |
| 3,668,096 | 6/1972 | Cook | 204/165 |
| 3,957,606 | 5/1976 | Shaw | 204/165 |
| 3,992,495 | 11/1976 | Sano et al. | 264/22 |

FOREIGN PATENT DOCUMENTS

| | | |
|---|---|---|
| 661195 | 4/1963 | Canada . |
| 371398 | 4/1932 | United Kingdom . |
| 883876 | 12/1961 | United Kingdom . |
| 1148946 | 4/1969 | United Kingdom . |
| 1156309 | 6/1969 | United Kingdom . |
| 1329348 | 9/1973 | United Kingdom . |
| 1330212 | 9/1973 | United Kingdom . |
| 1331558 | 9/1973 | United Kingdom . |
| 1338517 | 11/1973 | United Kingdom . |
| 1388201 | 3/1975 | United Kingdom . |
| 1417070 | 12/1975 | United Kingdom . |
| 1419053 | 12/1975 | United Kingdom . |
| 1444434 | 7/1976 | United Kingdom . |

OTHER PUBLICATIONS

Wisseroth, Nachr. Chem. Tech. Lab. 1979 pp. 327-328.
Nachr. Chem. Tech. Lab., vol. 27, No. 6, pp. 327, 328 (1979).
Lueger, Lexikon der Technite p. 371 (1960).

*Primary Examiner*—F. Edmundson
*Attorney, Agent, or Firm*—Ladas & Parry

[57] ABSTRACT

A method of, and apparatus for, the reduction of the activation energy of chemical reactions, wherein an electrical field is generated by a capacitor arrangement in the phase containing the educt.

9 Claims, 1 Drawing Figure

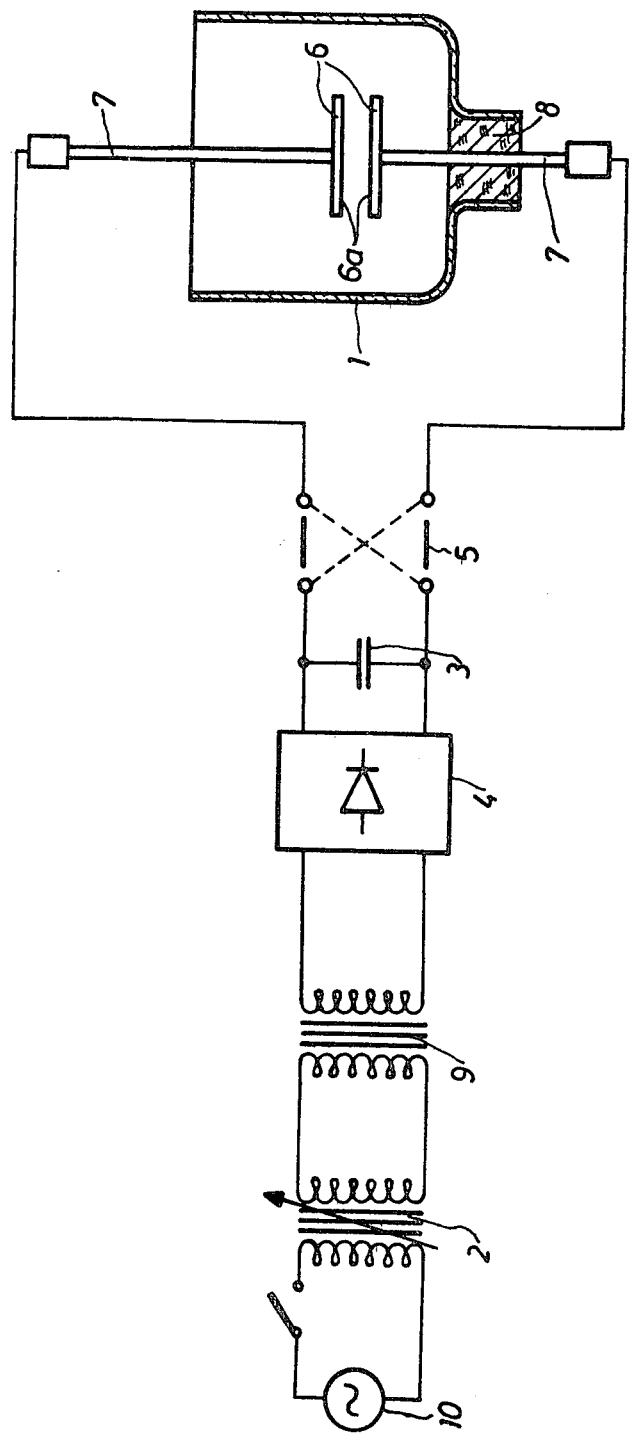

METHOD AND APPARATUS FOR REDUCING THE ACTIVATION ENERGY OF CHEMICAL REACTIONS

This is a continuation, of application Ser. No. 775,229 filed Mar. 7, 1977 now abandoned.

BACKGROUND OF THE INVENTION

The present invention relates to a new and improved method of reducing the activation energy of chemical reactions, and furthermore, pertains to apparatus for the performance of the aforesaid method.

Notwithstanding different advantages of organic electrochemistry such has heretofore remained more or less a stepchild of classical organic chemistry. This probably can be explained in terms of the drawbacks which are present, such as complicated cell construction, decomposition or degradation of the electrodes, expensive conducting salts and solvents, high current consumption and oftentimes complicated conditioning or working of the product. Additionally, classical electrochemistry is limited to oxidation- and reduction reactions.

SUMMARY OF THE INVENTION

Hence, it is a general object of the present invention to provide an improved method of, and apparatus for, reducing the activation energy of chemical reactions.

Another important object of the present invention aims at providing a method for the reduction of the activation energy of chemical reactions which is suitable for all other types of reactions for which there is not yet available any optimum catalysts and for which, as a general rule, there is required a considerable expenditure.

Now in order to implement these and still further objects of the invention, which will become more readily apparent as the description proceeds, the method of the present invention for the reduction of the activation energy of chemical reactions is manifested by the features that an electrical field is produced by means of a capacitor arrangement in the phase containing the educt.

With this method, and in contrast to classical electrochemistry, there does not flow any current apart from possible mini-currents. It is possible to term the method and the resultant reaction an electro-catalytic polarization reaction. The advantages of the inventive method should be apparent. There is obtained a catalytic effect without the use of expensive catalysts, possibly of the type which are consumed or poisonous and without great expenditure, since it is possible to work with the most simple process conditions. In the case of exothermic reactions, for instance, the activation energy is generally reduced to such an extent that such can take place at room temperature and at standard pressure. As a general rule, there is observed outstanding selectivity and a minimum of side reactions. The expenditure in energy is minimum, since for the reduction of the activation energy it is only necessary to produce the electrical field, however no current consumption occurs apart from possible inconsequential losses in the field system. Further advantages generally reside in simple processing or working of the product, for instance by distillation or filtration as well as lower waste.

The educts can be present in a random aggregate state, preferably however in a liquid phase. The educts can be, for instance, themselves in a liquid state or can be present in solution or as a dispersion.

To ensure maintenance of the capacitor arrangement of the method aspects of the invention, it is of course necessary that either the phase of the educt is electrically non-conductive or at least an electrode must be insulated, which can be accomplished for instance with glass.

It has been observed that the reactions take place at the electrode surface. The products which are formed can thus cover the surface of the electrodes and retard the reaction speed. In order to prevent this, it is possible to reverse the polarity of the field, so that the products, at the time that the field intensity reaches the value null, can detach from the electrodes and thus can be reclaimed.

Not only is the invention concerned with the aforementioned method aspects, but as already indicated relates to a new and improved construction of apparatus for the performance thereof which is manifested by the features that there is provided a reaction vessel in which there is mounted a capacitor arrangement for the purpose of producing an electrical field in the reaction medium, preferably at the phase boundary, electrode surface-educt.

A substance can be applied to the electrodes which, under the influence of the electrical field, exhibits catalytic properties. The electrodes themselves also can be formed of such a material or substance. As a general rule, this substance forms an insulating layer about the electrode which consists of a conductive material. The insulating layer also can be, for instance, the oxide layer of the relevant electrode material. The electrode material can be metallic or non-metallic, a mixture, an alloy, a semiconductor, an organo-metallic complex and so forth.

In order to generate the electrical field there is advantageously generally employed a direct-current voltage. This can attain values in the order of, for instance, 40 kV. By reversing the polarity, there also appear alternating-current voltages. The electrical field can also be indirectly applied, for instance ferroelectrically.

The method of the invention can also be combined with further reaction parameters, such as, for instance, temperature, pressure, electrode additives, gasification of the electrodes, additives applied to the reaction mixture, magnetic fields, electromagnetic radiation, for instance ultraviolet radiation, high-energy particle acceleration and so forth.

Also, the inventive method can be carried out continuously.

The method is preferably applicable with molecules having polarisable reactive groups, especially also with double- and multiple bonds, and it is possible to achieve dimerization or polymerization. The reaction participants also can exhibit a random aggregate condition.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically illustrates a circuit diagram of apparatus useful in the practice of the method of the invention.

DETAILED DESCRIPTION OF THE PREFERRED EMBODIMENTS

The invention will be now further described in conjunction with certain examples and experiments on the basis of the accompanying illustration.

Construction of the Apparatus

As will be seen from the drawing the therein depicted apparatus comprises a reaction vessel 1 formed of glass in which there are located the electrodes 6 which are threadably connected or otherwise appropriately attached to the associated stainless steel pins or rods 7. The region of entry of the lower electrode 6 is provided with a cork plug 8 surrounding the rod 7, in order to thereby compensate without any problem possibly occurring from differences in expansion of the metal and glass materials. The electrical conductors or lines lead from the electrodes 6 and their associated support rods 7 to a suitable current source 10 by means of the polarity reversal switch 5, the capacitor 3, the rectifier 4, the high-voltage transformer 9, and the regulator transformer 2.

The quality of the glass of the reaction vessel 1 does not play any role, since the reaction takes place at room temperature and standard pressure. Since the electrodes 6 are threaded onto the steel pins or rods 7, it is very easy to exchange such electrodes. The spacing of the electrodes 6 from one another is adjusted to be as small as possible, but without there occurring any sparking voltage. Of course, this is a function of the desired high voltage and the nature of the educt.

The not particularly illustrated cover of the reaction vessel 1 is usually loosely placed thereon, so that there are no problems in the presence of possible deflagrations. The polarity reversal switch 5 renders possible the detachment of the formed, adhering covering layers of the product from the surfaces of the electrodes 6. This polarity reversal switch 5 can be controlled automatically at a frequency of, for instance, 0 to 50 Hz. Consequently, the installation can be operated both with DC-voltage as well as also with AC-voltage of desired frequency.

The capacitor 3 serves for smoothing the pulsating direct-current voltage. The voltage across the electrodes 6 can be adjusted by means of the regulator or regulating transformer 2. As the current source there can be used a 220 volt alternating-current.

Manufacture of the Electrodes

The electrodes 6 preferably consist of a conductive metal or a metal alloy. The electrode surface generally designated by reference character 6a, is thereafter coated with a thin insulating layer in that, for instance, such electrode surface 6a is oxidated, chlorinated, or there is vapor deposited thereon a thin insulating layer.

Hereinafter there will be described the production of a number of electrode constructions:

(a) aluminum sheet (round discs having a central threading or threaded portion) are polished at both sides or faces and oxidized in an oxygen environment in the presence of high temperatures.

(b) aluminum sheet is polished and treated for about 30 seconds to 1 minute with concentrated acid salt.

(c) aluminum sheet is treated in the manner of the above-described paragraph (b), however with the use of nitric acid.

(d) $Al_2O_3$ is vapor deposited upon sheet copper or copper plating.

(e) the same procedures as described in paragraphs (a) and (c) are employed, however, while utilizing different metals or alloys, such as, for instance, nickel, lead, etc.

Classification of the Reaction Product

After the electro-polarization treatment the product is usually isolated by distillation, sometimes however also by filtration, sedimentation or by means of another separation process. The yield can be determined by weighing.

In order to classify the reaction product there are obtained IR-spectrums of the substrate and reaction products by means of a "Beckmann IR 8" instrument.

To examine the dependency of the inventive method upon different parameters there was examined the polymerization of vinyl acetate.

When vinyl acetate is treated with electro-polarisation (EP), then initially there was not detected any product. If following this treatment there was undertaken distillation (at standard pressure) and the EP-distillation procedure repeated two to three times, then there was obtained polyvinyl acetate. Upon each further repetition the yield increased. If, however, the distillation was carried out under vacuum conditions at low temperature then no reaction took place. In order to be certain that there did not occur any thermal polymerization there was thus carried out a reference test. The above procedures, resulting in a polymerization, were repeated without electrical voltage. The results were clearly negative.

During tests with other educts this behavior was not observed.

Examination of the Dependendy of an Electro-Polarization upon the Parameters based upon Polymerization of Vinyl Acitate The following parameters were examined
(a) Electrode material
(b) Electrode size
(c) Voltage
(d) Current-dependency
(e) Influence of the polarity reversal and the polarity reversal time
(f) Test duration
(g) Temperature (a) Electrode Material The greatest yield was observed with an aluminum-/aluminumoxide electrode. Poorer yields were obtained with Ni/Ni-oxide-electrodes, whereas other electrodes did not produce any polymerization.

With other educts there could be produced clearly qualitatively different products (e.g. propionaldehyde with Pb/Pb-oxide and Ni/Ni-oxide.)

(b) Electrode Size

Within the reproducibility of the experiment the yield increased as a function of the electrode surface.

(c) Voltage

The polymerization yield was examined as a function of the voltage in a range of 0.5 to 40 kV. Every 5 minutes the polarity was reversed and the test duration amounted to 2 hours. Between 5 and 40 kV there could not be determined any great differences. However, upon decrease of the voltage from 5 kV to 1 kV there was a significant reduction in the yield.

(d) Current Dependency

With a measuring instrument, where the smallest measurable current magnitude amounted to $10^{-9}$ amperes, there could not be detected any current flow. It was in fact possible to fuze one of both electrodes in glass, and nonetheless there was obtained a good yield of polyvinyl acetate.

(e) Influence of the Polarity Reversal and the Polarity Reversal Time

The polarity reversal switch 5 has the function of reversing the polarity of the rectified voltage which is applied to the electrodes 6. If this polarity reversal is omitted, then oftentimes the formed reaction products remain adhering to the surface of the electrodes and the yield decreases. A polymerization series was again carried out with vinyl acetate. Experiments were carried out with alternating-current voltage (50 Hz) with a polarity reversal time of 2,4,8, and 12 minutes up to constant direct-current voltage, with the same test duration (2 hours). As expected, the yield decreased with increasing polarity reversal times. With a polarity reversal time amounting to 12 minutes it was only extremely small and when using direct-current a major portion of the product remained adhering to the surfaces of the electrodes 6.

(f) Test Duration

The normal test duration amounted to 2 hours. In the case of vinyl acetate it was found that the quantity of polymer increased with the test duration. With a number of reactions there was observed a saturation effect, so that a prolonged test duration did not produce any increase in the yield. With other reactions there was obtained a complete reaction of the educt, such as for instance styrene and vinylidene chloride.

(g) Temperature

The polymerization can be carried out at room temperature. This is associated with the advantage that there occur very few side reactions. If there is carried out a EP-reaction at elevated temperature (e.g. boiled at the reflux), then no polymerization could be observed. This was in contrast to styrene where the elevated temperature had a favorable effect.

Other Examples of Electro-Polymerization Reactions (a) Polystyrene

In contrast to vinyl acetate the procedure need not be repeated and products were obtained already after the first treatment. The entire starting material could be converted into polymers. The most vehement reaction was observed with two $Al/Al_2O_3$-electrodes at elevated temperature. The next best was the same reaction carried out at room temperature.

A still weaker reaction was observed when the one electrode was fuzed in glass, and here also the temperature dependency is the same.

(b) Cyclohexine:

During the EP-treatment of cyclohexine there was again used the $Al/Al_2O_3$-electrode at 30 kV for 2 hours.

(c) Isoprene:

The reaction was carried out under the same conditions as in the immediately discussed paragraph (b), however with a Pb/PbO-electrode.

(d) Benzaldehyde and Acetophenone:

During the treatment of benzaldehyde and acetophenone with an $Al/Al_2O_3$-and a glass-electrode at 30 kV for a period of 2 hours there was formed a precipitate.

(e) Propionaldehyde:

With the known test arrangement, however when using two respective Pb/PbO-and Ni/NiO-electrodes, there was obtained in the first instance a flock-like product and in a second instance an oily product.

The yield of the inventive chemical reaction can be promoted by repeated build-up and decay of the electrical field, there thus also being intended to be included the reversal of the field.

Certain additives, such as, for instance, water in small quantities also could influence the chemical reaction.

The present invention is not compelled to rely upon peak discharges, as such, for instance, occur between a point-shaped and surface electrode. With a capacitor arrangement there do not occur such peak discharges between neighboring electrodes. With the invention, all of the electrodes forming the capacitor arrangement are preferably constructed to be of large surface area, and the educt and/or the surface layer of at least the one electrode forming the capacitor arrangement forms a type of dielectric.

It is important with the present invention that at least one of the electrodes or at least its surface layer is neither formed of a pure metal nor a pure metal alloy, rather, for instance, from an oxide of the corresponding metal or from an oxide of the corresponding metal alloy.

While there are shown and described present preferred embodiments of the invention, it is to be distinctly understood that the invention is not limited thereto, but may be otherwise variously embodied and practiced within the scope of the following claims. ACCORDINGLY.

What is claimed is:

1. A method of reducing the activation energy of polymerization reactions between organic molecules selected from the group consisting of olefins, dienes, O-vinyl compounds, halogenated hydrocarbons and aldehydes; and of polymerization reactions or aldol condensation reactions between molecules of benzaldehyde and acetophenone, comprising the steps of:
   producing an electrically non-conducting, liquid phase containing an educt; generating an electrostatic field by means of a capacitor arrangement in said phase with electrodes of which at least one comprises an electrically insulating surface layer consisting of an insulating metal oxide or metal chloride compound; and polymerizing or condensing said molecules.

2. The method as defined in claim 1, further including the step of:
   reversing the direction of the electrical field at predetermined time intervals.

3. The method as defined in claim 1, further including the step of:
   adding a substance which possesses a catalytic activity under the influence of the electrical field.

4. The method as defined in claim 1, further including the step of:
   repeatedly building-up and decaying the electrical field.

5. The method as defined in claim 1, in which the insulating surface layer is a metal oxide.

6. The method as defined in claim 1, wherein: said electrodes are formed of aluminum covered with an oxide layer.

7. The method as defined in claim 1, wherein: said electrodes are formed of lead covered with an oxide layer.

8. The method as defined in claim 1, wherein: said electrodes are formed of nickel covered with an oxide layer.

9. The method as defined in claim 1, wherein: said electrodes are formed of copper sheet upon which there is vapor deposited an aluminum oxide layer.

* * * * *